United States Patent [19]

Haland et al.

[11] Patent Number: 4,949,995
[45] Date of Patent: Aug. 21, 1990

[54] SAFETY BELT ARRANGEMENT

[75] Inventors: Lars Y. Haland, Falsterbo; Mats A. Karlin, Vargarda; Leif Ennerdahl, Alingsas; Enar T. Skanberg, Billdal, all of Sweden

[73] Assignee: General Engineering (Netherlands) B.V., Utrecht, Netherlands

[21] Appl. No.: 333,827

[22] Filed: Apr. 4, 1989

[30] Foreign Application Priority Data

Apr. 5, 1988 [GB] United Kingdom ............... 8807929

[51] Int. Cl.$^5$ .............................................. B60R 21/10
[52] U.S. Cl. ...................................... 280/805; 280/806
[58] Field of Search ...................... 280/801, 805, 806

[56] References Cited

U.S. PATENT DOCUMENTS

| 3,481,624 | 12/1969 | Barecki et al. | 280/805 |
| 4,129,321 | 12/1978 | Garvey | 280/805 |
| 4,201,418 | 5/1980 | Reidelbach et al. | 280/805 |
| 4,381,086 | 4/1983 | Pfeiffer | 280/805 |
| 4,394,034 | 7/1983 | Murphy et al. | 280/806 |
| 4,422,593 | 12/1983 | Takada | 280/806 |

FOREIGN PATENT DOCUMENTS 2113978 8/1983 United Kingdom .

Primary Examiner—Kenneth R. Rice
Attorney, Agent, or Firm—Spencer & Frank

[57] ABSTRACT

A safety belt for use in an automobile has a retractor reel incorporating a spindle onto which the belt is wound. The spindle can be locked, to prevent rotation of the spindle, in response to predetermined conditions, such as rapid deceleration of the automobile. The retractor reel is mounted on the chassis so that the reel can move relative to the chassis if a large force is applied thereto, by the safety belt, in excess of a predetermined limit. A clamp is also provided, which can clamp the safety belt leaving the reel, the clamp operating in response to movement of the reel as a consequence of the large force. A force limiter is provided to relieve any force exerted by the safety belt in excess of a predetermined limit.

12 Claims, 4 Drawing Sheets

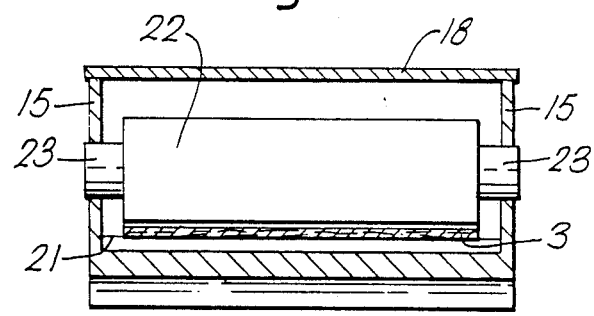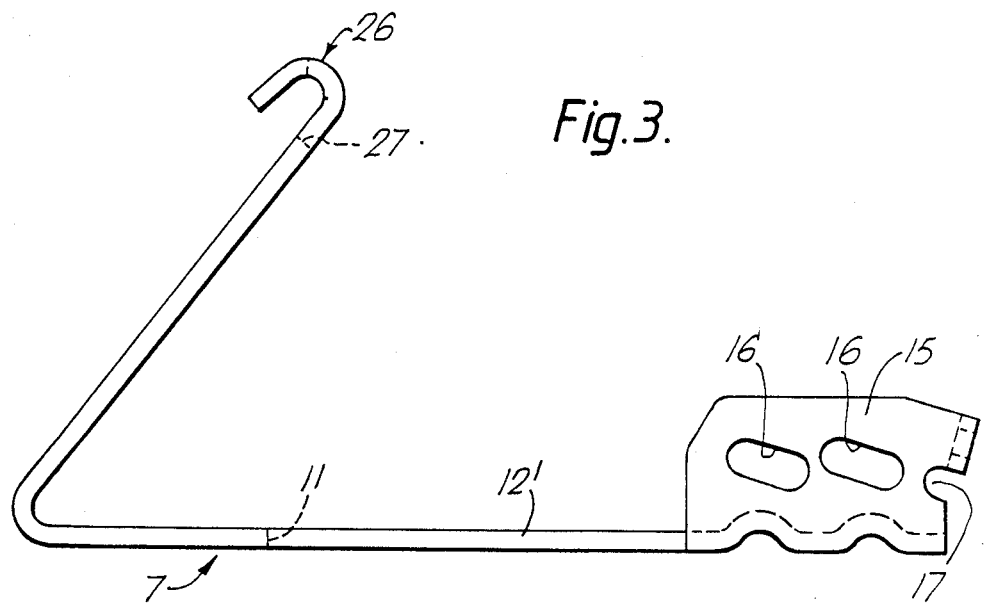

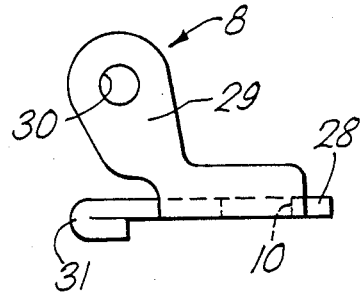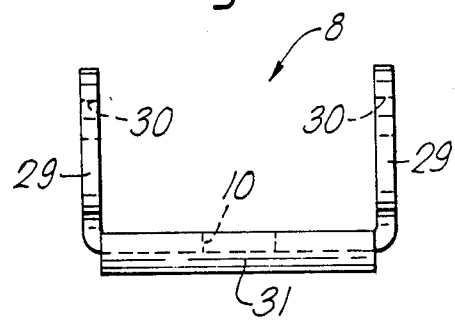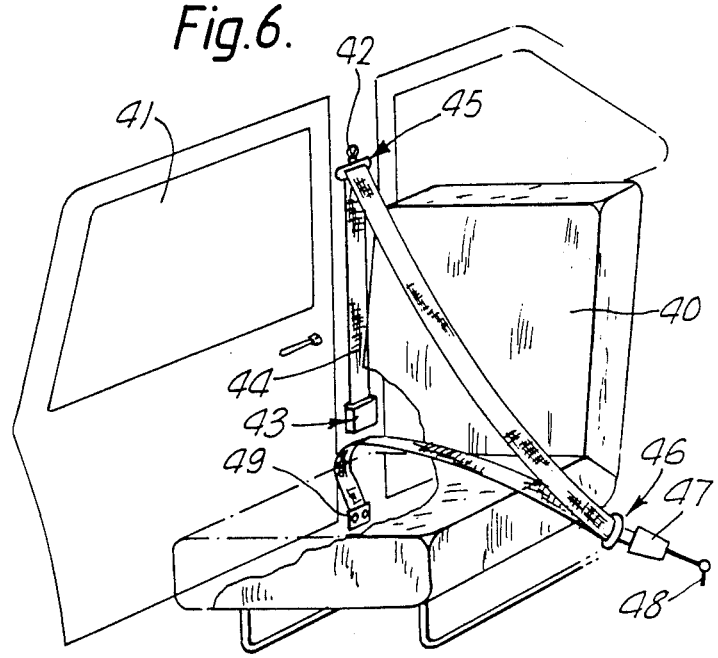

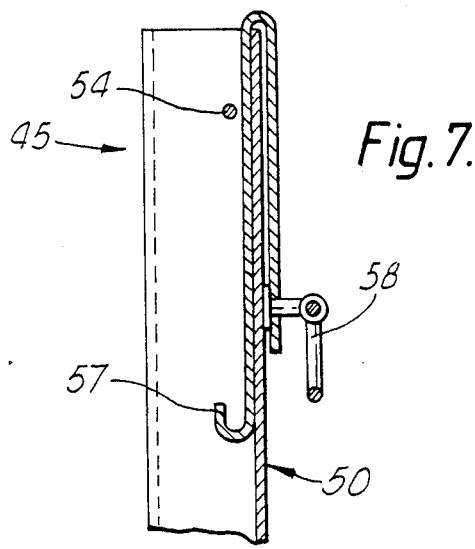
Fig. 7.
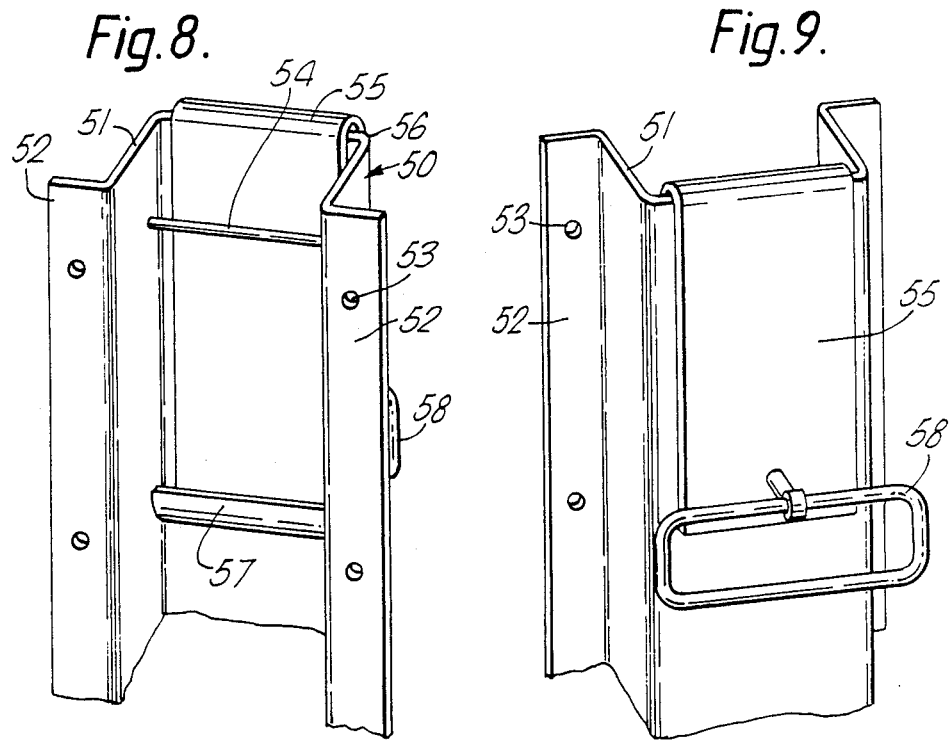
Fig. 8.
Fig. 9.

SAFETY BELT ARRANGEMENT

BACKGROUND OF THE INVENTION

1. Field of The Invention

The present invention relates to a safety belt arrangement, such as a safety belt arrangement for use in an automobile or other vehicle.

2. Background Art

A previously proposed safety belt arrangement incorporates a reel comprising a rotable spindle upon which the belt is wound. The spindle is spring biassed to wind in the belt. The reel also incorporates a locking arrangement to lock the spindle in response to the sensing of predetermined conditions such as a rate of vehicle deceleration in excess of a predetermined rate or the paying out of the belt from the reel at a rate in excess of a predetermined rate. Thus, for example, if an accident occurs in which a vehicle is subjected to an impact and thus decelerates at a very high rate, the spindle will be locked. In such a situation the occupants of the vehicle will continue to move forwardly within the vehicle as a result of the momentum which they possess immediately before the accident. A very large force will then be exerted upon the belt by its wearer, this force tending to extract the belt from the reel. This force exerted on the belt causes the portion of the belt which is wound upon the spindle to tighten around the stationary spindle, which in turn causes a further, short length of belt to be paid out.

The paying out of this further length of belt is particularly undesirable, since this enbables the wearer of the safety belt to move further forward within the vehicle before being restrained by the belt. In an accident situation it is desirable for the seat belt to restrain the occupant as quickly as possible, so as to prevent forward movement of the occupant towards the dashboard or windshield of the vehicle. In addition, when a large force is placed upon the belt by its wearer, the belt will stretch by a certain proportion and clearly the amount by which the belt stretches will be greater, if a greater length of belt is paid out from the reel. The paying out of a further length of belt from the reel, once the spindle has been locked is sometimes referred to as the "film spool effect".

The film spool effect may be partially overcome by using a web lock, this being a locking arrangement which serves to clamp the belt web itself in order to prevent the paying out of an further length of belt from the reel once the spindle has been locked. Various web lock designs have been proposed previously and examples are shown in British Patent Documents GB2168593A, GB-2177891A and French Patent Document FR2511320C.

The web locks described in these various prior art documents utilise the force present in the belt web to move the web lock into engagement with the belt. This prevents any further length of belt from being paid out. The web lock must open again, so as to release the belt web once the force in the web has dropped to a level below a predetermined level. It has been proposed that the web lock may be actuated so as to lock the belt web whenever the spindle locking arrangement is actuated, but this results in significant, unnecessary wear of the belt web. British Patent document GB 2113978A discloses a web lock which is adapted to be actuated only in response to movement of the retractor reel. The retractor reel is slidably mounted in position, but is biassed to a lower position by means of a spring. The described arrangement is such that when the spindle of the retractor reel is locked, due, for example, to deceleration of the vehicle, any tension applied to the safety belt will tend to move the retractor reel upwardly, against the biassing effect of the spring. This upward movement of the retractor reel causes a clamping member to firmly clamp the belt web in the region where the web leaves the retractor reel. However, a disadvantage of this arrangement is that if an extremely high force is applied to the safety belt, by the weight of the person restrained by the safety belt being thrown forwardly, there is no "give" at all in the system, and the person restrained by the safety belt can actually be injured by the safety belt. The present invention seeks to avoid this particular difficulty.

SUMMARY OF THE INVENTION

In the invention, a force limiter is incorporated into the safety belt system, so that if a very large force is exerted on the safety belt, for example when the safety belt is rapidly decelerating a person restrained by the safety belt, then one of the anchorages for the safety belt may move slightly, thus tending to relieve this very high force.

Thus one embodiment of the invention comprises a safety belt arrangement arrangement for use in a vehicle, said arrangement comprising a safety belt, a rectractor reel for the safety belt, said retractor reel incorporating a spindle, means to wind the belt on to the spindle, means to lock the spindle on which the belt is wound in response to predetermined conditions, means to mount the retractor reel on the vehicle so that the reel can move relative to the vehicle if a large force is applied to the reel by the belt in excess of a predetermined force, a clamp movable to clamp the safety belt leaving the reel, means to operate said clamp in response to movement of said reel as a consequence of said large force, and means mounting said clamp in position, said clamp mounting means incorporating a force limiter, such that is a force is applied to the clamp greater than a second predetermined force, the clamp will move relative to the vehicle.

Preferably the means to mount the retractor reel to the vehicle exert friction, such friction having to be overcome by the said large force before the reel can move.

Alternatively the means to mount the retractor reel to the vehicle include a spring exerting a force which must be overcome by the said large force before the reel can move.

In a preferred embodiment the clamp comprises an element movable axially in response to movement of the reel relative to the vehicle, the clamp element being associated with guide means which move the clamp element into clamping engagement with the belt when the clamp element is moved axially.

Conveniently the clamp element has laterally projecting pins received in opposed slots which constitute the guide means.

Preferably the clamp is mounted on a support, the support having means to mount the support on a vehicle so that the support can move relative to the vehicle if a force in excess of said secnd predetermined force is applied to the clamp by the safety belt.

Another aspect of this invention provides a safety belt arrangement in a vehicle comprising a safety belt, a retractor reel to retract the safety belt, a clamp to clamp part of the safety belt, the clamp being mounted on a support, the support being secured to the vehicle so that the support can move relative to the vehicle if a very large force is applied to the clamp by the safety belt.

Preferably the support comprises a plate-like element of elongate form, said clamp being mounted on the support adjacent one end thereof, a portion towards the other end of the support being bent back around a fixed point, there being means engaging the bent back part to act as a guide, the support being drawn past the fixed point and to the guide when subjected to said very large force.

Preferably means are provided to limit the movement of said support, and said means may comprise a hook-like formation at the other end of said support, and means to engage and retain the hook-like formation when said support has moved to a predetermined position.

In another aspect this invention provides a safety belt arrangement in a vehicle comprising a safety belt, a retractor reel for the safety belt, said retractor reel being mounted on the vehicle and forming a first anchorage for the belt, a pillar loop mounted on the vehicle, through which the belt passes, comprising a second anchorage, a buckle, means to releasably connect the belt to the buckle, said buckle comprising a third anchorage for the belt, the retractor reel being mounted on the vehicle by mounting means adapted to permit the reel to move if a force in excess of a predetermined force is applied thereto, a clamp operable to clamp safety belt leaving the reel, and force limiting means mounting one of said anchorages to the vehicle such that the anchorage will remove in response to a force in excess of a predetermined limit being applied thereto by the belt, to relieve the force.

Preferably the clamp is operable in response to movement of the reel.

Conveniently the force limiting means comprise a plate-like element of elongate form, said anchorage being mounted on the element adjacent one end thereof, a portion towards the other end being bent back around a fixed point, there being means to engage the bent back part to act as a guide, the element being drawn past the fixed point and the guide in response to said force in excess of said predetermined limit.

The force limiting means may be associated with the first anchorage or with the second anchorage.

It will be appreciated, therefore, that in operation of embodiments of the invention if a person is restrained by the safety belt arrangement, and the vehicle is involved in an accident situation, initially the retractor reel will lock, secondly the retractor reel will move, when the force or tension present in the safety belt exceeds a first predetermined limit, thus operating a clamp which will prevent any further safety belt being withdrawn from the retractor reel by virtue of the "film spool" effect, and if the force then applied to the safety belt exceeds a second predetermined limit, the force limiter will actuate, thus effectively moving one of the anchorages of the safety belt to relieve the very high force or tension then present in the safety belt. This will serve to minimise any risk of the safety belt injuring a person wearing the safety belt.

BRIEF DESCRIPTION OF THE DRAWINGS

FIG. 2 is a sectional view taken on the lines II—II of FIG. 1;

FIG. 3 is a side elevation of one component of the safety belt arrangement of FIG. 1;

FIG. 4 is a side elevation of a further component of the safety belt arrangement of FIG. 1;

FIG. 5 is an end elevation of the component illustrated in FIG. 4;

FIG. 6 is a perspective view illustrating a safety belt arrangement in accordance with the invention when mounted in a motor vehicle, with parts of the seat of the motor vehicle being cut away;

FIG. 7 is a sectional view taken through a pillar loop mounting which may form part of one embodiment of the invention;

FIG. 8 is a rear view of the pillar loop mounting of FIG. 7, and

FIG. 9 is a front view of the pillar loop mounting of FIG. 7.

DESCRIPTION OF THE PREFERRED EMBODIMENT

Figure 1:
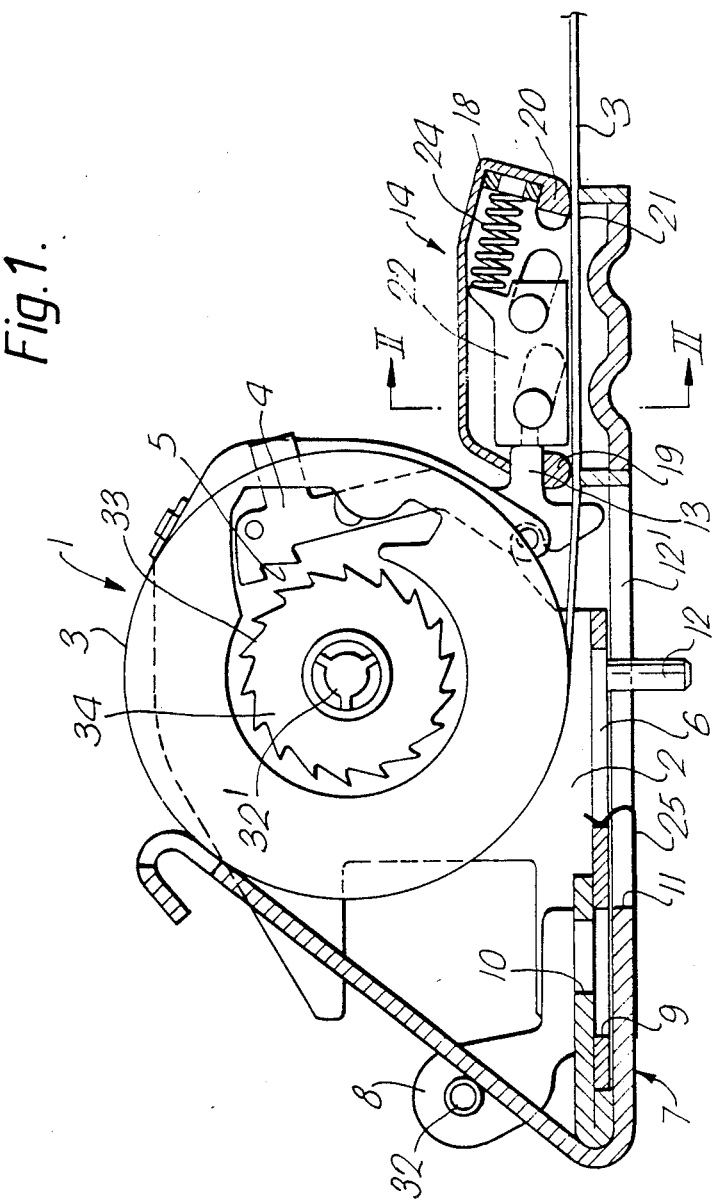
FIG. 1 is a schematic, sectional view through the retractor reel assembly of a safety belt arrangement in accordance with the present invention.

Referring to the drawings, FIG. 1 illustrates a safety belt arrangement having belt storage means in the form of a reel assembly 1 of the type as described in U.S. Pat. No. 4,619,419 the teaching of which is incorporated herein by reference. The illustrated reel assembly 1 has a frame or housing 2 which has two spaced-apart parallel arms (not shown) defining apertures through which pass the ends of a rotatable spindle 32' upon which a safety belt 3 is wound, one end of the belt being secured to the spindle. The ends of the spindle 32' engage bearings formed on a releasable cover for the reel (not shown). The bearings are located adjacent the exterior faces of the arms. The belt 3 is paid out from the reel 1 at the lower edge thereof in a direction towards the right as illustrated in FIG. 1. The spindle 32' is spring biassed to rotate in a clockwise direction as viewed in FIG. 1, so as to wind the belt onto the spindle.

The reel assembly 1 is provided with means for locking the spindle 32' against rotation, in the form of a pivotable arm 4 provided at one end with teeth 5 which are movable into engagement with corresponding teeth 33 placed upon the periphery of a member 34 mounted at one end of the spindle. The arm 4 may be moved to lock the spindle in response to one or more sensors which detect predetermined conditions, such as the rate of deceleration of the vehicle in which the safety belt arrangement is mounted or the rate at which the safety belt is being paid out from the reel 1.

The housing 2 of the reel 1 has a substantially planar base 6 which is received upon a base plate 7. The base 6 supports the two spaced-apart arms. The base plate 7 is illustrated in side view in FIG. 3 of the drawings. A further component 8 in the form of a substantially U-shaped element is received upon part of the planar base 6 of the housing of the reel such that part of the base 6 is effectively sandwiched between the base plate 7 and the further component 8. The base 6 of the housing is provided with an oval aperture 9, which extends axially of the base whilst the further component 8 has a circular aperture 10 which is co-aligned with part of the aperture 9.

To the left of a point 11 the base plate 7 is formed as two spaced-apart arms with a central cut-out region. When the aperture 10 is aligned with the aperture 9, a bolt (not shown) may be passed through the aligned apertures and through the base plate 7 so as to secure the components to the chassis of a vehicle in which the safety belt arrangement is mounted. However, the elongate nature of aperture 9 through the base 6 of the housing for the reel 1 allows the housing and thus the reel to move to the right as illustrated in FIG. 1 of the drawings when a force in excess of a predetermined force is applied to the reel. The predetermined force is dictated by the frictional effects restraining movement of the base 6.

The base 6 of the housing is also provided with a downwardly depending pin 12 which passes through an axially extending slot 12' formed in the base 6 and into a corresponding slot formed in the chassis of the vehicle.

A spring 25 lies under the base plate 7 and is retained by the bolt which passes through the apertures 9 and 10. One end of the spring passes through the slot 12' and engages part of the base 6 biassing the base 6 to the left as shown in FIG. 1.

The front of the housing 2 i.e. that region of the housing in which lies to the right in FIG. 1 of the drawings is provided with a projection 13 which extends into a web lock 14.

At its right hand end, the base plate 7 is provided with opposed, upstanding arms 15, such that at the right hand end, the base plate 7 is substantially U-shaped in section. The web lock 14 is received between the arms 15. Each arm 15 defines two inclined slots 16. The slots are angled downwardly towards the right in FIGS. 1 and 3 of the drawings. A recess 17 is defined in the right hand edge of each upstanding arm 15, the recess 17 serving to receive a cover 18 which extends up and over the web lock 14. When extracted from the reel 1 the belt 3 passes through the web lock 14 and the free ends of the cover 18 are rounded at 19, 20 and act as a guide for the belt. At the point where the belt 3 passes through the web lock 14 the belt passes over a raised, smooth surface 21 formed on a block of low friction material secured to the base 6.

The web lock 14 comprises a clamping member 22 provided on opposed sides with pairs of horizontally outwardly extending pins 23. The pins 23 are dimensioned to be received within the slots 16 defined by the upstanding arms 15 at the right hand end of the base plates 7. Thus, the clamping member 22 is supported between the arms 15. A pair of springs 24 extend between the cover 18 which is fixed to the upstanding arms 15 and an adjacent portion of the clamping member 22 and serve to bias the clamping member 22 to the left hand end of the slots 16, as illustrated in FIG. 1 of the drawings. When the clamping member 22 is in this position, with the pins 23 received at the left hand end of the slots 16, the clamping member may be considered to be in a raised position, since the cooperating surfaces of the pins 22 and the slots 16 cause the clamping member 23 to rise upwardly as it moves to the left. When in this raised position, the left hand edge of the clamping member 22 touches against the projection 13 formed on the front of the housing 2 of the reel 1. The underside of the clamping member 22 is formed with teeth (not specifically illustrated in the drawings). When the clamping member 22 is in the raised position the belt web 3 may pass freely between the underside of the clamping member and across the smooth raised surface 21. Thus, under normal operating conditions the belt 3 may be withdrawn from the reel 1 in the normal manner. The gap between the clamping member 32 and the smooth surface is between 1.5 and 2.5 times the thickness of the belt.

It will be appreciated that if the clamping member 22 is caused to move to the right relative to the remaining components illustrated in FIG. 1, then the clamping member will be forced to move both to the right and in a downwards direction due to the cooperation of the pins 23 within the slots 16. Such movement will cause the clamping member 22 to come into clamping engagement with the region of the belt which is positioned between the clamping member 22 and the raised surface 21. The teeth on the underside of the clamping member 22 will then grasp the belt 3. If an attempt is then made to pull the belt 3 to the right as shown in FIG. 1 of the drawings, this will cause the clamping member 22 to move further to the right and downwardly so as to clamp the belt even tighter.

Thus, in use, when the spindle 32' of the reel 1 is locked and a force in excess of a predetermined force is exerted to the right upon the belt 3 then the housing of the reel assembly 1 may move to the right, with the projection 13 causing the clamping member 22 to move to the right and thus down into engagement with the belt 3 in order to firmly clamp the belt 3. Once the belt has been clamped by the web lock 14, no more belt will be paid out (not even as a result of the "film spool effect") and thus the wearer of the belt will not move any further forward in the vehicle (apart form the effect of the natural "stretch" of the belt) since the belt is firmly clamped in position by the web lock 14. It will appreciated that the force acting on the web must be sufficient to overcome the friction force which will be acting on that part of the base 6 of the housing of the reel 1 which is received between the further component 8 and the base plate 7 and also sufficient to overcome the force of the spring 25. The reel 1 will then move, but the force must also be sufficiently large that when the reel 1 moves it is possible to overcome the force in the springs 24 which serve to retain the clamping member in the raised position. Thus the clamping member is moved to the clamping position.

It will be appreciated that once the tooth on the underside of the clamping member 22 have engaged the upper surface of the belt 3, the movement of the belt will cause the clamping member to clamp the belt. Thus, the higher the load on the belt web, the harder the web will be clamped between the raised surface 21 and the clamping member 22.

In order to minimise the movement of the real required in order to cause the clamping member to clamp the belt 3 a connection between the locking arrangement which serves to lock the spindle of the reel 1 and the clamping member may be provided such that when the locking arrangement locks the spindle of the reel, the clamping member 22 is moved to a position very close to, but not actually in engagement with the belt 3. Should the force exerted on the reel 1 then exceed the predetermined limit, the reel 1 only needs to move a very short distance in order to cause the belt 3 to be clamped by the web lock 14.

The angle of the slots 16 within the upstanding arms 15 must be selected such that the belt web will in fact be clamped by the clamping member 22 once the underside of the clamping member comes into engagement with the belt 3. In addition, the angle of the slots 16 must be such that the clamping member 22 may return to the raised position, under the action of the spring 24, once the force upon the belt 3 drops below the predetermined level. It should also be noted that the spring (not shown) which biases the spindle 32' within the reel 1 in a clockwise direction as viewed in FIG. 1 will also serve to assist in moving the clamping member 22 to the raised position.

It is advantageous if one region of the clamping member 22 comes into engagement with the belt 3 before the remainder of the clamping member engages the belt 3. To this end the angle of the slots 16 may be arranged such that the edge of the clamping member nearest to the reel 1 contacts the belt 3 first. Thus, the slots 16 to the left in FIGS. 1 and 3 may have a steeper angle of inclination than the slot 17 to the right.

In order to minimise the movement of the reel 1 before the clamping member 22 engages the belt 3 the slots may be configured such that an upper portion thereof is of relatively steep inclination, whilst the lower portion is of a shallower inclination. Once the teeth of the underside of the clamping member 22 have engaged the upper surface of the belt, the belt movement will serve to pull the clamping member down and into a firm clamping position. Thus, the steeper inclined portion of the slot 16 will move the underside of the clamping member into contact with the belt, whilst the pins 23 are guided along the shallower section of the slots 16 as the belt web is clamped.

The gap between the underside of the clamping member 22 and the raised surface 21 should be approximately one and a half to two and a half times the thickness of the belt web.

The safety belt arrrangement also incorporates a force limiter which serves to limit the force transmitted to the wearer of a belt when the wearer is thrown forward when the belt is in the locked condition.

The force limiter is formed by the left hand end of the base plate 7 and the further component 8. At its left hand end, the two spaced-apart arms of the base plate 7 are bent upwardly and backwardly and terminate at an upper free end with a hook region 26. Thus, the left hand end of the base plate is a substantially swanneck configuration. As previously mentioned, the region of the base plate 7 to the left of the point 10 has a central cutaway region, such that it is effectively formed as two spaced-apart arms. The cutaway region terminates at a point 27 adjacent the hook region 26, such that the hook extends fully across the width of the base plate.

The further component 8 is substantially U-shaped in section and has a central base 28 formed at opposed edges with upstanding walls 29. Each upstanding wall 29 defines a circular bore 30. The left hand edge of the base 28 is folded under upon itself, such that the base terminates at one end with a rounded portion 31. When the further component 8 is placed in position upon the base plate 7, the rounded portion 31 is received within the included angle defined by the upwardly and backwardly bent portion of the base plate 7. The upper region of each upstanding wall 29 including the bore 30, projects beyond the upwardly and backwardly extending region of the base plate. A pin 32 extends through the bores 30 and bridges the space between the two walls 29. The uppermost surface of the upwardly and backwardly extending portion of the base plate 7 engages against the pin 32, as is clearly illustrated in FIG. 11 of the drawings. The pin 32 and the further component 8 are both firmly secured to the chassis of the vehicle in which the safety belt arrangement is mounted. The force limiting arrangement will only come into operation when a very high force is exerted upon the belt web 3 and in such circumstances, the web lock 14 will already have been activated to clamp the belt. Thus, the high force exerted on the belt 3 will be transmitted to the web lock 14 and will be tending to pull the entire web lock 14 and the base plate 7 to the right in FIG. 1 of the drawings. Since the left hand portion of the base plate 7 is formed with a central cut-out region through which the bolt securing the arrangement to the chassis of the vehicle passes, the base plate 7 and the web lock may move to the right.

As the base plate 7 is pulled to the right, the upwardly and backwardly bent portion at the left hand end of the base plate is pulled around the rounded portion 31 of the further component 8 due to the malleable nature of the base plate 7. The engagement of the upwardly and backwardly extending portion of the base plate 7 with the pin 32 in the further component 8 prevents that upwardly and backwardly extending portion from being straightened out, but causes that portion to be bent around the rounded portion 31 as previously mentioned. The permissable movement of the base plate 7 is limited by the engagement of the hook region 26 over the pin 32.

This movement of the web lock and base plate 7 allows a small further length of belt web to be paid out, which effectively releases the tension in the part of the belt around the wearer of the belt thereby reducing the force transmitted to the wearer.

In order to reduce the friction between the further component 8 and the upwardly and backwardly extending portion of the base plate 7 when the force limiting arrangement is actuated, the pin and/or the further component 8 may be provided with rollers at those points where the base plate 7 is contacted.

If the real 1 is also movable with the force limiting arrangement, then the overall arrangement will require more space. It is therefore preferable for the reel not to move when the force limiting arrangement is acutated. It is therefore necessary if the real is retained stationary to arrange for a further length of belt to be paid out from the reel, whilst the web lock and base plate are moving. If the movement of the web lock is only a very short distance then the belt paid out by the reel as a result of the "film spool effect" may suffice, since this length of belt will be present between the reel and the web lock. However, if the movement of the web lock is somewhat greater, for example 60 millimetres, then an additional arrangement will need to be incorporated so as to release these locking mechanisms which lock the spindle 32' of the reel 1 under appropriate circumstances so as to allow a further length of belt to be paid out.

The release of the locking arrangement on the spindle 32' may be operated by means of a clutch or by means of deformation of a part of the reel 1.

FIG. 6 illustrates a safety belt arrangement in accordance with the invention when installed in a vehicle such as an automobile. The figure illustrates, schematically, a seat 40 for a motor vehicle, the front door 41 of the vehicle and the adjacent door post or "B-post" 42.

A retractor reel and clamp assembly 43, of the type described above with reference to FIGS. 1 to 5 is mounted on the "B-post" adjacent the base thereof. A safety belt 44 has one end received within the retractor reel assembly 43. The safety belt passes to a pillar loop 45, which is mounted on the "B-post" at a position adjacent the shoulder of a person sitting on the seat 40. The safety belt 44 passes through the pillar loop and passes then diagonally across the seat 40, to a tongue 46, which is mounted on the saftey belt, the tongue being received within a buckle 47 which is anchored 48 to the floor of the motor vehicle. A further portion of the belt passes from the tongue 46, back across the seat, to an anchoring point 49 adjacent the base of the door post. As will be readily appreciated, this configuration for a safety belt is, in itself, conventional, but the retractor reel assembly 43 has the novel configuration as described with refrence to FIGS. 1 to 5.

It will be appreciated that in the event of an accident arising, in which a very significant force is applied to the safety belt 44 after the retractor reel has locked, firstly the clamp will clamp the safety belt, and if the force is of a very high value, the retractor reel and clamp will move, thus relieving the force provided in the diagonally extending portion of the belt. However, the force appearing in the diagonally extending portion of the belt may be relieved in another way, for example by incorporating a force limiter into the pillar loop assembly 45.

FIGS. 7, 8 and 9 illustrate a pillar loop assembly 45 which incorporates a force limiter. The pillar loop assembly illustrated in these figures comprises a main support comprising a channel member 50 which has, adjacent the ends of the side walls 51 of the channel two outwardly directed flanges 52 which are provided with apertures 53 to receive bolts by means of which the channel may be mounted on the "Bpost 42". A transverse rod or bar 54 extends across the channel adjacent the top thereof. An elongate strip or plate-like element 55 is provided which is bent back over a fixed point 56 constituted by the top of the channel. The strip passes between the bar 54 and the base of the channel, and the lower end of the strip 55 terminates in a hook-like projection 57. The other end of the strip passes down the front of the channel, as can be seen in FIG. 9 and has mounted thereon a ring or loop 58 through which the safety belt may be passed. Of course, the channel and the strip 55 may be masked by an appropriate housing, which is not shown for the sake of clarity of illustration.

It will be appreciated that the safety belt will be passed through the loop 58 in the normal way. If a very significant force is applied to the safety belt, the force will be exerted on to the loop 58, tending to move the loop 58 downwardly. As the loop 58 moves downwardly, so the elongate strip or plate-like element 55 will be drawn downwardly, with the portion of the strip or plate-like element 55 shown in FIG. 8 moving upwardly. It will be appreciated that the plate or strip-like element 55 will move past the fixed point 56 and will be guided by the transverse rod or bar 54 until the plate or strip-like element 55 has moved to such a position that the hook-like terminal portion 57 visible in FIG. 8 engages the transverse rod or bar 54.

It will be appreciated that the complete safety belt arrangement must be replaced after the force limiting arrangement has been used.

It will be appreciated that various modifications and alterations may be made to the above-described embodiment without departing from the scope of the present invention.

What is claimed is:

1. A safety belt arrangement for use in a vehicle, said arrangement comprising a safety belt, a retractor reel for the safety belt, said retractor reel incorporating a spindle, means to wind the belt on to the spindle, means to look the spindle on which the belt is wound in response to predetermined conditions, means to mount the retractor reel on the vehicle so that the reel can move relative to the vehicle if a large force is applied to the reel by the belt in excess of a predetermined force, a clamp movable to clamp the safety belt leaving the reel, means to operate said clamp in response to movement of said reel as a consequence of said large force, and means mounting said clamp in position, said clamp mounting means incorporating a force limiter, such that if a force is applied to the clamp greater than a second predetermined force, the clamp will move relative to the vehicle.

2. An arrangement according to claim 1 wherein the means to mount the retractor reel to the vehicle exert friction, such friction having to be overcome by the said large force before the reel can move.

3. An arrangement according to claim 1 wherein the means to mount the retractor reel to the vehicle include a spring exerting a force which must be overcome by the said large force before the reel can move.

4. An arrangement according to claim 1 wherein the clamp comprises an element movable axially in response to movement of the reel relative to the vehicle, the clamp element being associated with guide means which move the clamp element into clamping engagement with the belt when the clamp element is moved axially.

5. An arrangement according to claim 4 wherein the clamp element has laterally projecting pins received in opposed slots which constitute the guide means.

6. An arrangement according to claim 1 wherein the clamp is mounted on a support, the support having means to mount the support on a vehicle so that the support can move relative to the vehicle if a force in excess of said second predetermined force is applied to the clamp by the safety belt.

7. A safety belt arrangement for a vehicle, comprising:
    a safety belt;
    a retractor reel for retracting said safety belt;
    a clamp for clamping part of said safety belt;
    a support including a plate-like element of elongate form, said clamp being mounted on said support adjacent one end thereof, a portion of said support disposed towards the other end of said support being bent back around a fixed point to provide a bent back part; and
    means engaging the bent back part to act as a guide, said support being secured to the vehicle for movement relative to the vehicle if a very large force is applied to said clamp by said safety belt, said support being drawn past the fixed point and to said guide when subjected to the very large force.

8. An arrangement according to claim 7 wherein means are provided for limiting the movement of said support.

9. An arrangement according to claim 8 wherein said means for limiting the movement of the support includes a hook-like formation at the other end of said support, said arrangement further comprising means for engaging and retaining the hook-like formation when said support has moved to a predetermined position.

10. A safety belt arrangement for a vehicle, comprising:
- a safety belt;
- a retractor reel for said safety belt, said retractor reel being mounted on the vehicle and being a first anchorage for said belt;
- a pillar loop mounted on the vehicle, through which said belt passes, and being a second anchorage;
- a buckle;
- means for releasably connecting said belt to said buckle, said buckle comprising a third anchorage for said belt,
- mounting means mounting said retractor reel on the vehicle and permitting said reel to move if a force in excess of a predetermined force is applied thereto;
- a clamp operable to clamp said safety belt leaving said reel, said clamp being operable in response to movement of said reel;
- force limiting means mounting one of said anchorages to the vehicle for causing said anchorage to remove in response to a force in excess of a predetermined limit being applied thereto by said belt for relieving the force, the force limiting means including a plate-like element of elongate form, said one of said anchorages being mounted on said element adjacent one end thereof, a portion of said element disposed towards the other end of said plate-like element being bent back around a fixed point and providing a bent back part;
- means for engaging said bent back part to act as a guide; and
- said element being drawn past the fixed point and said guide in response to the force in excess of said predetermined limit.

11. An arrangement according to claim 10 wherein said force limiting means is associated with said first anchorage.

12. An arrangement according to claim 10 wherein said force limiting means is associated with said second anchorage.

* * * * *